W. RICHMOND, T. RYAN & J. McGILL.
Smut-Mill.

No. 167,788.

2 Sheets--Sheet 1.

Patented Sept. 14, 1875.

WITNESSES
Robert Everett
M. Carroll

INVENTORS
William Richmond
Thomas Ryan
James McGill

ATTORNEYS

2 Sheets--Sheet 2.

W. RICHMOND, T. RYAN & J. McGILL.
Smut-Mill.

No. 167,788. Patented Sept. 14, 1875.

WITNESSES
Robert Everitt
Eugene W. Johnson

INVENTORS
William Richmond
Thomas Ryan
James McGill
Chipman & Jossmett
ATTORNEYS

UNITED STATES PATENT OFFICE.

WILLIAM RICHMOND, THOMAS RYAN, AND JAMES McGILL, OF LOCKPORT, NEW YORK.

IMPROVEMENT IN SMUT-MILLS.

Specification forming part of Letters Patent No. 167,788, dated September 14, 1875; application filed April 17, 1875.

*To all whom it may concern:*

Be it known that we, WILLIAM RICHMOND, THOMAS RYAN, and JAMES McGILL, of Lockport, in the county of Niagara and State of New York, have invented a new and valuable Improvement in Smut-Mills; and we do hereby declare that the following is a full, clear, and exact description of the construction and operation of the same, reference being had to the annexed drawings, making a part of this specification, and to the letters and figures of reference marked thereon.

Figure 1:
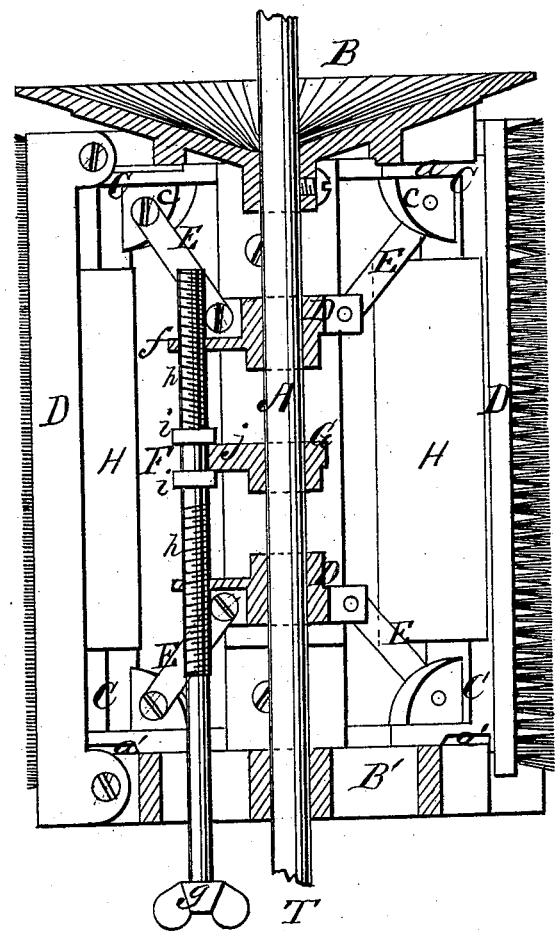
Figure 2:
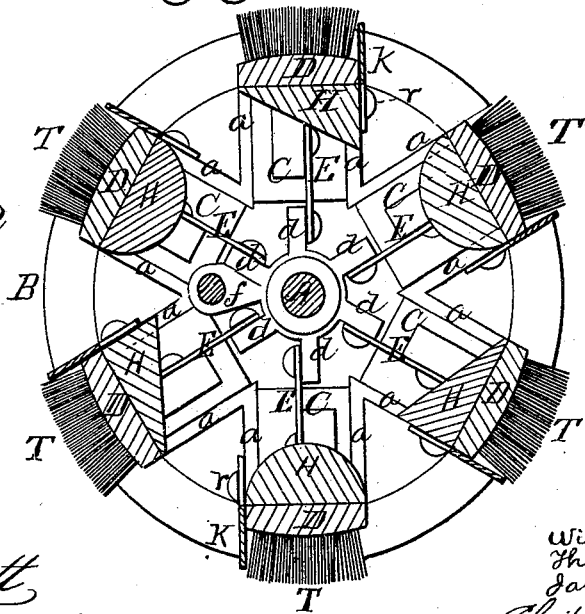
Figure 3:
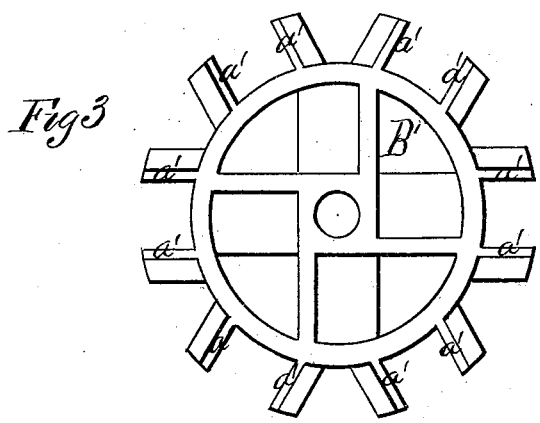

Figure 1 of the drawings is a representation of a vertical central section of our mill, and Fig. 2 is a horizontal sectional view of the same. Figs. 3, 4, 5, and 6 are detail views.

This invention has relation to improvement in smut-machines, for which Letters Patent of the United States, dated January 5, 1875, and numbered 158,524, were granted to William Richmond, as executor of James Richmond, deceased.

The object of the invention is to produce, by means of devices substantially as hereinafter described, an accurate and even adjustment of the brushes to or from the inside of the scouring-case, thus adapting the device to be used in cleaning different varieties of grain.

In the annexed drawings, A designates a cylindrical shaft, upon which are rigidly secured, preferably, metallic heads or spiders B B', the same being at a suitable distance apart, and adapted, by means of guides *a a'*, respectively, upon the upper head B and the lower head B', to receive the projecting arm *b* of angular end plate C, rigidly secured in any suitable manner to the brush-backs D. Guides *a a'* are arranged in pairs, and these pairs are equal in number to the number of brushes intended to be used.

In practice, head B will be solid and cup-shaped, its concavity being upward and radially serrated for the purpose of distributing the grain evenly around the inside of the scouring-case, and the lower spider will be open for the purpose of allowing air to penetrate into the interior of the scouring-case.

Figure 4:
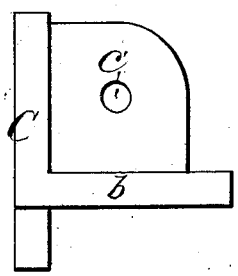
Figure 5:
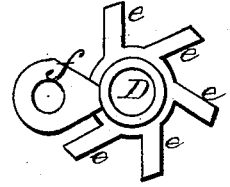
Figure 6:
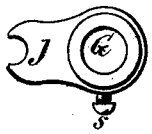

Plates C, as shown in Fig. 4, are each provided with an eye, *c'*, at the angle of the arms, for a purpose hereinafter fully explained.

D represents sliding spiders, arranged upon shaft A, and adapted to have free movement thereon, which spiders have a number of arms, *e*, equal in number to that of the brushes employed. Spiders D and angular plates C are connected together by means of rods E of suitable length, which rods are pivoted to the lug *c* and arm *e*, and the said spiders are each provided with a female-screw-threaded projection, *f*, the thread in one of the projections being right-handed and in the other left-handed. F represents a metallic rod passing upward through projections *f*, which rod is threaded to correspond with the threads of the said projections, and is adapted to be rotated therein by means of an operating-handle, *g*, rigidly secured upon its lower end, which projects through the scouring-case. When this rod is caused to rotate in one direction sliding spiders D will be forced away from each other, thus forcing the brushes radially outward against, or rather close to, the interior of the scouring-case through the medium of rods E, and when it is actuated in the opposite direction the said slides will be drawn together, causing the said brushes to recede from the scouring-case, thus adapting them for use with different varieties of grain. This adjustment may be had without opening the scouring-case, as the end of rod F projects through and below it. With a view to holding rod F against endwise displacement during such actuation collars *i* are rigidly secured thereon at a slight distance apart between screw-threads *h*, between which is received a bifurcation upon the end of an arm, *j*, forming a part of an annular sleeve or collar, G, clamped in position on shaft A by means of a set-screw, *s*. H represent strengthening-strips, rigidly secured upon the brush-backs, having rounded or beveled inner edges, as shown in Fig. 2. By this means dust scoured out of the grain is prevented from lodging on the backs of the brushes, and will be blown out of the spout in the usual well-known way, thus keeping the interior of the brush-frame clean, and preventing grain subsequently subjected to the machine from being unduly contaminated.

Each brush, which I shall now designate by the letter T, is provided with the usual well-known beaters K, the same being of metal, and rigidly secured by means of screws r to guides a a', with their outer edges flush with the corresponding edge of the brush-back, and extending the whole length thereof.

What we claim as new, and desire to secure by Letters Patent, is—

1. In a smut-machine, the ways or guides a a', of heads B B', in combination with the angular plates C of the detachable and radially-movable scourer-brushes T, substantially as specified.

2. The angular plates C, having lugs c and guides a, in combination with a scourer-brush, substantially as described, and for the purpose set forth.

3. The connecting-toggles E, in combination with the sliding spiders D, and plate C guided in ways a a' of heads B B', substantially as specified.

4. The combination of a sleeve, G, having a bifurcated arm, j, with shaft A, and operating-rod F, substantially as specified.

In testimony that we claim the above we have hereunto subscribed our names in the presence of two witnesses.

WILLIAM RICHMOND.
THOMAS RYAN.
JAMES McGILL.

Witnesses:
MYRON L. BURRELL,
WILLIAM S. FARNELL.